United States Patent
Oda et al.

(10) Patent No.: US 10,724,144 B2
(45) Date of Patent: Jul. 28, 2020

(54) MODULE AND MODULE ACCOMODATION DEVICE

(71) Applicant: Kyocera Corporation, Kyoto (JP)

(72) Inventors: Tomoyuki Oda, Kyoto (JP); Eizou Matsui, Kizugawa (JP); Takashi Ono, Kirishima (JP); Masanori Suehiro, Kusatsu (JP)

(73) Assignee: KYOCERA Corporation, Kyoto-shi, Kyoto (JP)

( * ) Notice: Subject to any disclaimer, the term of this patent is extended or adjusted under 35 U.S.C. 154(b) by 4 days.

(21) Appl. No.: 15/539,176

(22) PCT Filed: Dec. 18, 2015

(86) PCT No.: PCT/JP2015/085484
§ 371 (c)(1),
(2) Date: Jun. 23, 2017

(87) PCT Pub. No.: WO2016/104361
PCT Pub. Date: Jun. 30, 2016

(65) Prior Publication Data
US 2017/0350025 A1 Dec. 7, 2017

(30) Foreign Application Priority Data
Dec. 24, 2014 (JP) .................... 2014-260674

(51) Int. Cl.
*H01M 8/04* (2016.01)
*H01M 8/24* (2016.01)
(Continued)

(52) U.S. Cl.
CPC ............. *C25B 9/18* (2013.01); *C25B 1/04* (2013.01); *C25B 1/10* (2013.01); *C25B 15/08* (2013.01);
(Continued)

(58) Field of Classification Search
CPC ........ H01M 8/04; H01M 8/0625; H01M 8/24; H01M 8/243; H01M 8/249; H01M 8/2475; H01M 2008/1293
See application file for complete search history.

(56) References Cited

U.S. PATENT DOCUMENTS

2010/0167154 A1   7/2010   Ono
2011/0117457 A1*  5/2011   Nakamura ........ H01M 8/04014
                                              429/408
(Continued)

FOREIGN PATENT DOCUMENTS

EP    2639871 A1    9/2013
JP    2007059377 A  3/2007
(Continued)

OTHER PUBLICATIONS

International Search Report based on Application No. PCT/JP2015/085484 (3 Pages and 2 Pages of English translation) dated Mar. 15, 2016.

*Primary Examiner* — Stephen J Essex
(74) *Attorney, Agent, or Firm* — Viering, Jentschura & Partner MBB

(57) ABSTRACT

A module of the present invention is formed by housing, in a housing container, a cell stack device that includes cell stacks comprising an arrangement of a plurality of cells. The housing container includes a housing chamber that houses the cell stack device; a first gas introduction section provided in a lower portion of the housing chamber and configured to introduce a first gas supplied into the housing chamber; and a first gas circulation section provided on a side of the housing chamber and connected to the first gas introduction section. The width of the first gas circulation section is narrower than the width of the first gas introduction section.

14 Claims, 10 Drawing Sheets

(51) Int. Cl.

| | | |
|---|---|---|
| *C25B 9/18* | (2006.01) | |
| *C25B 1/04* | (2006.01) | |
| *C25B 15/08* | (2006.01) | |
| *C25B 1/10* | (2006.01) | |
| *H01M 8/2475* | (2016.01) | |
| *H01M 8/249* | (2016.01) | |
| *H01M 8/243* | (2016.01) | |
| *H01M 8/0612* | (2016.01) | |
| *H01M 8/124* | (2016.01) | |

(52) U.S. Cl.
CPC ............... *H01M 8/04* (2013.01); *H01M 8/24* (2013.01); *H01M 8/2475* (2013.01); *H01M 8/0625* (2013.01); *H01M 8/243* (2013.01); *H01M 8/249* (2013.01); *H01M 2008/1293* (2013.01); *Y02E 60/366* (2013.01)

(56) References Cited

U.S. PATENT DOCUMENTS

| | | |
|---|---|---|
| 2011/0123881 A1 | 5/2011 | Nakamura et al. |
| 2012/0251904 A1 | 10/2012 | Izawa et al. |
| 2016/0087296 A1 | 3/2016 | Murase et al. |

FOREIGN PATENT DOCUMENTS

| | | | |
|---|---|---|---|
| JP | 2009205806 A | | 9/2009 |
| JP | 2011249160 A | | 12/2011 |
| JP | 2013030359 A | | 2/2013 |
| JP | 2014026863 A | * | 2/2014 |
| JP | 2014026863 A | | 2/2014 |
| WO | 2009119615 A1 | | 10/2009 |
| WO | 2014189135 A1 | | 11/2014 |

* cited by examiner

MODULE AND MODULE ACCOMODATION DEVICE

RELATED APPLICATIONS

The present application is a national stage entry according to 35 U.S.C. § 371 of PCT application No.: PCT/JP2015/085484 filed on Dec. 18, 2015 which claims priority from Japanese application No.: 2014-260674 filed on Dec. 24, 2014, and is incorporated herein by reference in its entirety.

TECHNICAL FIELD

The present disclosure relates to a module and a module accommodation device.

BACKGROUND

In recent years, a variety of fuel cell modules have been proposed as next generation energy sources. Such fuel cell modules comprise a cell stack device housed in a housing container, and the cell stack device includes a cell stack comprising an arrangement of a plurality of fuel cells, which area type of cell (e.g. see Japanese Unexamined Patent Application Publication No. 2007-59377A).

Such housing containers are provided with a passage for supplying oxygen-containing gas to the fuel cells, and a passage for discharging exhaust gases discharged from the fuel cells out of the housing container.

Additionally, in recent years, a high temperature water-vapor electrolysis method has been proposed that uses an electrolytic cell that includes a solid oxide electrolyte membrane (SOEC) as the type of cell.

SUMMARY

However, in order to improve power generation efficiency and electrolytic efficiency, there is a need in such modules for a passage structure whereby the gas supplied into the housing chamber housing the cells and the gas discharged from the cells can flow efficiently.

A module according to an aspect of the present disclosure includes a housing container; and a cell stack device housed in the housing container and including a cell stack comprising an arrangement of a plurality of cells. In such a module, the housing container includes a housing chamber housing the cell stack device, a first gas introduction section provided in a lower portion of the housing chamber and configured to introduce a first gas supplied into the housing chamber, and a first gas circulation section provided on a side of the housing chamber and connected to the first gas introduction section. Additionally, in a cross-section orthogonal to an arrangement direction of the cells, a width of the first gas circulation section is narrower than a width of the first gas introduction section.

A module accommodation device according to an aspect of the present disclosure includes the module described above; an auxiliary device that actuates the module; and an exterior case housing the module and the auxiliary device.

BRIEF DESCRIPTION OF THE DRAWINGS

FIG. 2A is a side view and FIG. 2B is a partial enlarged plan view of the portion circled by the dashed line in FIG. 2A.

FIG. 6A is a perspective view and FIG. 6B is a plan view.

DETAILED DESCRIPTION

A module and a module accommodation device according to the present embodiment will be described hereinafter using the drawings. Note that common reference signs are used for components that are the same as components illustrated in the other drawings.

Figure 1:
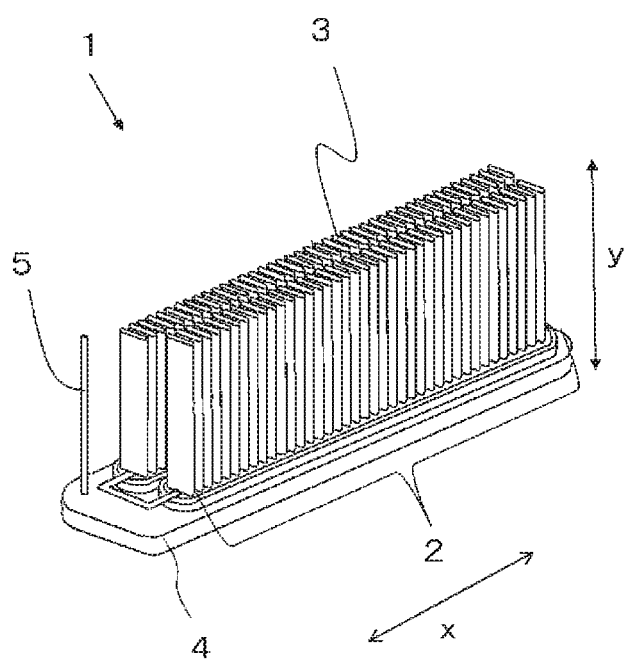
FIG. 1 is a perspective view illustrating an example of a cell stack device housed in a module according to a present embodiment.
Figure 2A:
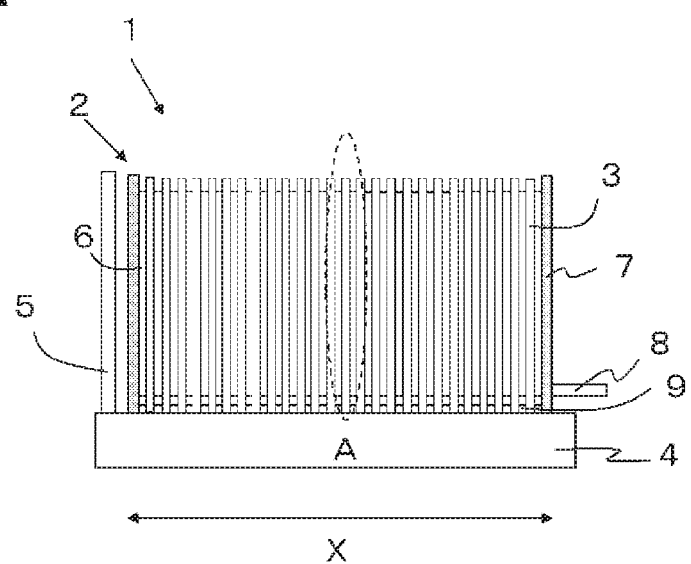
FIGS. 2A and 2B illustrate the cell stack device illustrated in FIG. 1.
Figure 2B:
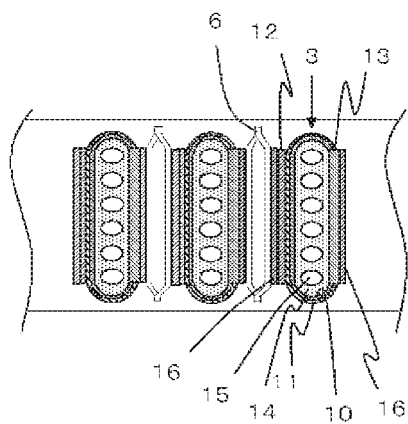

FIG. 1 is an exterior perspective view illustrating an example of a cell stack device for a module according to the present embodiment. FIGS. 2A and 2B illustrate the cell stack device illustrated in FIG. 1. FIG. 2A is a plan view, and FIG. 2B is an enlarged cross-sectional view of the portion circled by the dashed line in FIG. 2A. Additionally, in the following drawings, solid oxide fuel cells are primarily used to describe the cells. However, there are also cases where electrolytic cells capable of producing hydrogen are used as the cells and, in these cases, only configurations differing from cases where fuel cells are used shall be described.

The cell stack device 1 illustrated in FIGS. 1, 2A, and 2B includes two cell stacks 2. In each of the cell stacks 2, fuel cells 3 are arranged uprightly in a row (the X-direction illustrated in FIG. 1), each including a gas flow passages 15 through which fuel gas flows from one end of the cell to the other end; the fuel cells 3 adjacent to each other are electrically connected in series via electrically conductive members 6; and a lower end of each of the fuel cells 3 is fixed to a manifold 4 by an electrically insulative bonding material 9.

Note that, when electrolytic cells are used as the cells, water vapor flows through the gas flow passages 15. Additionally, in order to collect the hydrogen produced in the electrolysis reaction, an upper end of each of the cells is also fixed to a manifold by an electrically insulative bonding material such as a glass sealing material or the like.

The examples of the fuel cells 3 illustrated in FIGS. 1, 2A, and 2B are hollow flat plate-shaped fuel cells each including a plurality of gas flow passages that allow the fuel gas to flow through the fuel cells 3 in the longitudinal direction thereof. The fuel cells 3 are solid oxide fuel cells that each include a support body also including gas flow passages as well as a fuel electrode layer, a solid electrolyte layer, and an oxygen electrode layer layered in that order on the surface of the support body. Note that oxygen-containing gas flows between the fuel cells 3. The configuration of the fuel cells 3 will be described below. Note that in the fuel cell device according to the present embodiment, the fuel cells 3 may be plate-shaped or cylinder-shaped, for example, and the shape of the cell stack device 1 may be modified as appropriate.

Moreover, a cell stack supporting member 7 (hereinafter, sometimes abbreviated as "stack supporting member 7") is provided. The cell stack supporting member 7 is electrically connected to the fuel cell 3 positioned outermost in each cell stack 2 via an electrically conductive member 6. A protective cover may be provided on the outer side of each stack supporting member 7. These protective covers protect the stack supporting members 7 and the cell stacks 2 from contact with thermal insulating materials disposed around the cell stacks 2 and from external impacts. Furthermore, an electrically conductive member 6 that protrudes outward from the cell stacks 2 is connected to the stack supporting members 7.

Note that FIGS. 1, 2A, and 2B illustrate an example in which the cell stack device 1 includes two cell stacks 2. However, the number of cell stacks may be changed as appropriate; for example, the cell stack device 1 may include only one cell stack 2. Moreover, the cell stack device 1 may also include a reformer (described later).

The manifold 4 stores fuel gas to be supplied to the fuel cells 3. The manifold 4 includes a gas case having an opening formed in the top surface thereof and a frame into which the fuel cells 3 are fixed and that is fixed to the gas case.

The frame encloses one end of each of the fuel cells 3 (the bottom ends in FIGS. 2A and 2B), and the peripheries of the bottom ends of the fuel cells 3 are fixed using the insulative bonding material 9 with which the inside of the frame is filled. In other words, each cell stack 2 houses a plurality of the fuel cells 3 such that the fuel cells 3 are arranged side by side within the frame and is bonded to the frame using the insulative bonding material 9. Note that the insulative bonding material 9 is made from a material such as glass to which a prescribed filler is added to achieve the desired coefficient of thermal expansion.

A gas circulation pipe 8 that circulates the fuel gas produced by the hereinafter described reformer is connected to the top surface of the manifold 4. Note that when electrolytic cells are used as the cells, water vapor can flow in this gas circulation pipe 8. The fuel gas or the water vapor is supplied to the manifold 4 via the gas circulation pipe 8. The fuel gas or the water vapor is then supplied via the manifold 4 to the gas flow passages 15 formed inside the fuel cells 3.

As illustrated in FIG. 2B, each fuel cell 3 is column-shaped (for example, hollow flat plate-shaped) and includes a column-shaped conductive supporting substrate 14 (hereinafter, sometimes abbreviated as "supporting substrate 14") that has a pair of flat surfaces facing one another; and a fuel-side electrode layer 10, a solid electrolyte layer 11, and an air-side electrode layer 12 are stacked in that order on one of the flat surfaces. An interconnector 13 is formed on the other flat surface of the fuel cell 3, and a p-type semiconductor layer 16 is formed on the outer (upper) surface of the interconnector 13. The p-type semiconductor layer 16 connects the electrically conductive member 6 to the interconnector 13, thus forming an ohmic contact therebetween and making it possible to reduce the voltage drop thereacross and effectively avoid declines in current collection performance. Note that, the electrically conductive member 6 and the stack supporting members 7 are omitted in FIG. 1. Furthermore, on a premise that the supporting substrate doubles as the fuel-side electrode layer, the fuel cell may be formed by the solid electrolyte layer and the air-side electrode layer being stacked on the surface of the supporting substrate.

A well-known conventional material may be used for the fuel-side electrode layer 10. For example, the fuel-side electrode layer 10 may be formed of $ZrO_2$ (referred to as a stabilized zirconia that also includes partially stabilized zirconia) containing a porous conductive ceramic such as a rare earth element oxide in solid solution and Ni and/or NiO.

The solid electrolyte layer 11 is required to function as an electrolyte that allows electrons to move between the fuel-side electrode layer 10 and the air-side electrode layer 12 and as a gas barrier that prevents fuel gas and oxygen-containing gas leaks. As such, the solid electrolyte layer 11 is formed of $ZrO_2$ containing from 3 to 15 mol % of a rare earth element oxide in solid solution. Note that the solid electrolyte layer 11 may be formed from another material as long as that material exhibits the above-described properties.

The material for the air-side electrode layer 12 is not particularly limited, and any well-known conventional material may be used. For example, the air-side electrode layer 12 may be formed of an electrically conductive ceramic made from a so-called $ABO_3$ perovskite oxide. The air-side electrode layer 12 is required to be gas permeable, and it is preferable that the open porosity of the air-side electrode layer 12 be greater than or equal to 20% and particularly in the range of 30 to 50%.

The supporting substrate 14 is required to be gas permeable to allow the fuel gas to permeate through to the fuel-side electrode layer 10 and is also required to be electrically conductive in order to allow electrical conduction via the interconnector 13. Therefore, a material such as an electrically conductive ceramic or cermet may be used for the supporting substrate 14. During production of the fuel cells 3, if the supporting substrate 14 is produced at the same time as the fuel-side electrode layer 10 or the solid electrolyte layer 11 using a sintering process, it is preferable that the supporting substrate 14 be made from an iron group metal and a prescribed rare earth oxide. Moreover, in each of the fuel cells 3 illustrated in FIGS. 2A and 2B, the column-shaped (hollow flat plate-shaped) supporting substrate 14 has a long, thin plate shape that extends in the erecting direction (the Y-direction illustrated in FIG. 1) and includes two flat surfaces and two semicircular side surfaces. Furthermore, to ensure gas permeability, it is preferable that the supporting substrate 14 have an open porosity of greater than or equal to 30% and particularly in the range of 35 to 50%. It is also preferable that the supporting substrate 14 have an electrical conductivity of greater than or equal to 300 S/cm and particularly greater than or equal to 440 S/cm. In addition, the supporting substrate 14 may be cylinder-shaped as long as the overall columnar shape is retained.

Examples of the p-type semiconductor layer 16 may include a layer formed of a perovskite transition metal oxide, for example. More specifically, a material that has a higher electron conductivity than that of the material forming the interconnector 13 such as a p-type semiconductor ceramic formed of at least one of an $LaMnO_3$ oxide, an $LaFeO_3$ oxide, and an $LaCoO_3$ oxide having Mn, Fe, Co, or the like at the B site may be used, for example. It is generally preferable that the thickness of this p-type semiconductor layer 16 be in the range of 30 to 100 μm.

A material such as a lanthanum chromite perovskite oxide ($LaCrO_3$ oxide) or a lanthanum strontium titanium perovskite oxide (LaSrTiO$_3$ oxide) may be used for the interconnector 13, as described above. These materials have electrically conductive property and do not reduce or oxidize upon coming into contact with the fuel gas (a hydrogen-containing gas) or the oxygen-containing gas (air or the like). Moreover, the interconnector 13 is required to be dense in order to prevent leaks of the fuel gas flowing through gas passages 11 formed in the supporting substrate 14 as well as leaks of the oxygen-containing gas flowing outside the supporting substrate 14. Thus, it is preferable that the interconnector 13 have a relative density of greater than or equal to 93% and particularly greater than or equal to 95%.

Furthermore, the electrically conductive members interposed to electrically connect the fuel cells 3 and the cell stack supporting members 7 may be formed of an elastic metal or alloy or of a metal fiber or alloy fiber felt to which necessary surface treatments have been applied.

Figure 3:
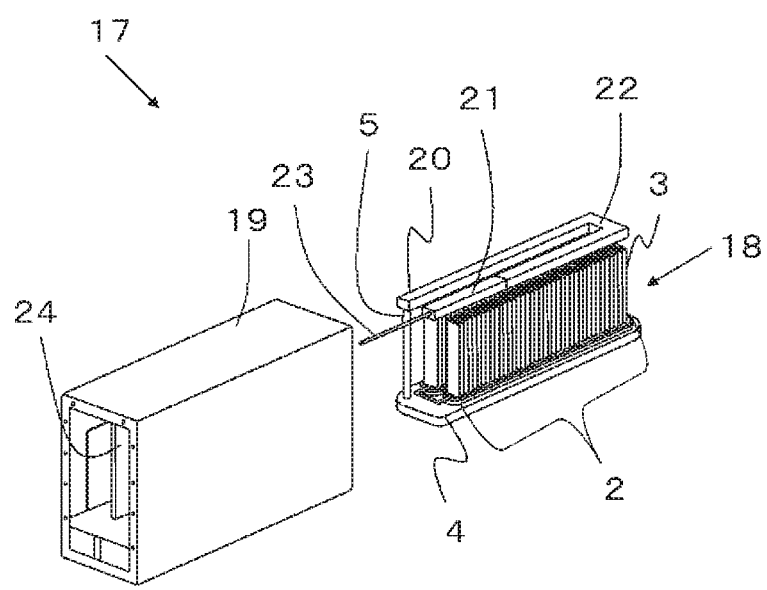
FIG. 3 is a perspective view illustrating an example of the module according to the present embodiment.
Figure 4:
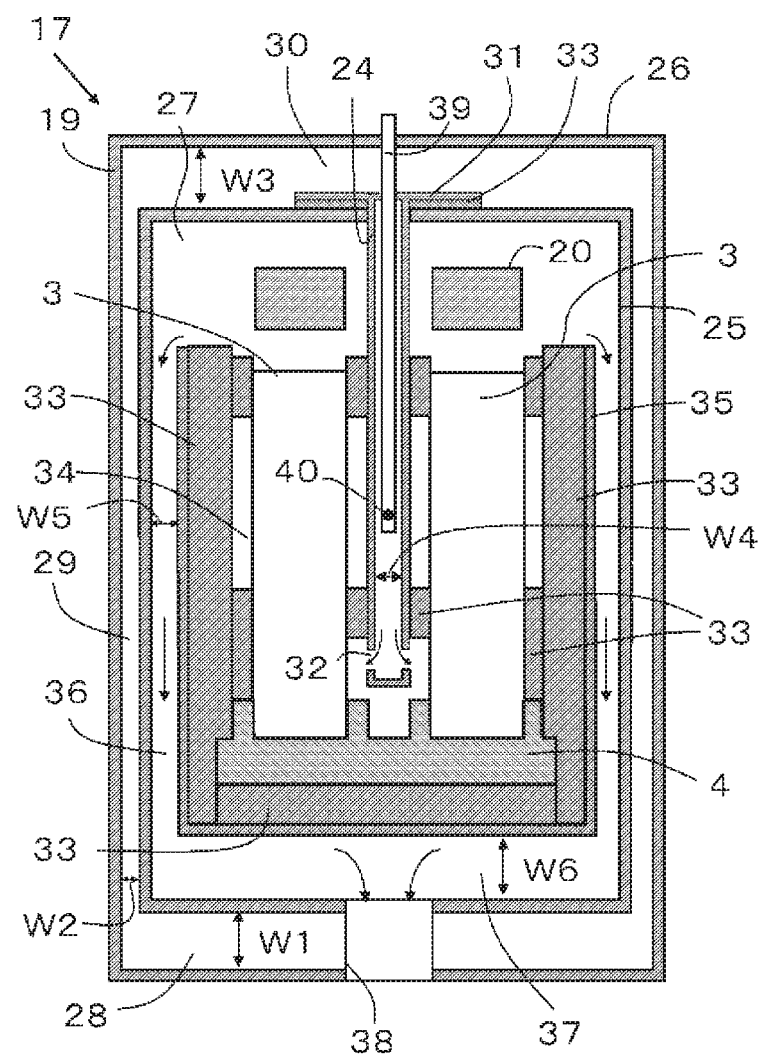
FIG. 4 is a cross-sectional view of the module illustrated in FIG. 3.

FIG. 3 is an exterior perspective view illustrating an example of the module (fuel cell module) including the cell stack device 18 according to the present embodiment. FIG. 4 is a cross-sectional view of FIG. 3. Note that, in the following description, the term "cross-sectional view" means a cross-sectional view orthogonal to the arrangement direction of the fuel cells 3.

In a module 17 illustrated in FIG. 3, the cell stack device 18 according to the present embodiment is housed within a housing container 19. A reformer 20 configured to produce fuel gas to be supplied to the fuel cells 3 is disposed above the cell stack device 18.

Moreover, the reformer 20 illustrated in FIG. 3 reforms a raw fuel such as natural gas or kerosene supplied via a raw fuel supply pipe 23 to produce the fuel gas. The reformer 20 preferably has a structure that enables steam reforming, which has a reformation reaction with good reforming efficiency. The reformer 20 includes a vaporizing unit 21 configured to vaporize water and a reforming unit 22 including a reforming catalyst (not illustrated) for reforming the raw fuel into fuel gas.

Moreover, FIG. 3 illustrates the cell stack device 18 housed in the housing container 19, with the cell stack device 18 extracted rearward and a portion of the housing container 19 (front and back surfaces) removed. Here, in the module 17 illustrated in FIG. 3, the cell stack device 18 can be slid into and housed in the housing container 19.

Note that a first gas supply member, namely an oxygen-containing gas supply member 24, is disposed in the interior of the housing container 19, between the cell stacks 2 arranged side by side on the manifold 4, so that the first gas, namely the oxygen-containing gas, flows between the fuel cells 3, from a lower end portion toward an upper end portion.

As illustrated in FIG. 4, the housing container 19 of the module 17 has a two-layer structure that includes an inner wall 25 and an outer wall 26. The outer wall 26 forms the outer frame of the housing container 19, and the inner wall 25 forms a housing chamber 27 that houses the cell stack device 18.

The housing container 19 includes a first gas introduction member, namely an oxygen-containing gas introduction section 28, that introduces oxygen-containing gas from outside into the housing chamber 27. The oxygen-containing gas introduced to the oxygen-containing gas introduction section 28 flows upward in a first gas circulation member, namely an oxygen-containing gas circulation section 29. This oxygen-containing gas circulation section 29 is provided on a side of the housing chamber 27 between the inner wall 25 and the outer wall 26, and is connected to the oxygen-containing gas introduction section 28. Next, the oxygen-containing gas flows through a first gas distribution member, namely an oxygen-containing gas distribution section 30. This oxygen-containing gas distribution section 30 is provided in an upper portion of the housing chamber 27 between the inner wall 25 and the outer wall 26 and is connected to the oxygen-containing gas circulation section 29. Here, the oxygen-containing gas distribution section 30 includes, on an upper side, an oxygen-containing gas inflow opening (not illustrated) through which the oxygen-containing gas flows, and a flange 31; and, on a lower side, an oxygen-containing gas supply unit, namely the oxygen-containing gas supply member 24, including an oxygen-containing gas outflow opening 32 through which the oxygen-containing gas flows toward a lower end portion of each of the fuel cells 3. The oxygen-containing gas supply member 24 is inserted through the inner wall 25 and fixed. Thus, the oxygen-containing gas distribution section 30 is connected to the oxygen-containing gas supply member 24. Moreover, a thermal insulating member 33 is disposed between each flange 31 and the inner wall 25.

Note that while the oxygen-containing gas supply member 24 is disposed between the two cell stacks 2 arranged side by side in the interior of the housing container 19 in FIG. 4, the location of the oxygen-containing gas supply member 24 may be changed as appropriate in accordance with the number of the cell stacks 2. For example, when the housing container 19 houses only one cell stack 2, two oxygen-containing gas supply members 24 may be provided and disposed so as to sandwich the cell stack 2 from both side surface sides.

Inside the housing chamber 27, the thermal insulating members 33 for maintaining the temperature inside the module 17 at a high temperature are provided as appropriate to prevent a large amount of the heat inside the module 17 from being radiated away, which would cause the temperature of the fuel cells 3 (the cell stacks 2) to decrease and thereby cause the power generation amount to decrease.

It is preferable that the thermal insulating members 33 be arranged in the vicinity of the cell stacks 2. It is particularly preferable that the thermal insulating members 33 be arranged on the side surfaces of the cell stacks 2 along the arrangement direction of the fuel cells 3 and that the thermal insulating members 33 have a width greater than or equal to the width of the side surfaces of the cell stacks 2 in the arrangement direction of the fuel cells 3. It is preferable that the thermal insulating members 33 be disposed on both side surface sides of the cell stacks 2. This configuration makes it possible to effectively suppress temperature decreases in the cell stacks 2. Furthermore, this makes it possible to suppress oxygen-containing gas introduced by the oxygen-containing gas supply member 24 from being discharged from the side surface sides of the cell stacks 2, thereby making it possible to promote the flow of oxygen-containing gas between the fuel cells 3 of the cell stacks 2. Note that openings 34 are formed in the thermal insulating members 33 arranged on both side surface sides of the cell stacks 2 in order to regulate the flow of oxygen-containing gas supplied to the fuel cells 3 and to decrease the differences in temperature in the longitudinal direction of the cell stacks 2 as well as in the arrangement direction of the fuel cells 3.

Moreover, exhaust gas inner walls 35 are formed on inside the inner wall 25 along the arrangement direction of the fuel cells 3. The space between the inner wall 25 and the exhaust gas inner walls 35 on the side of the housing chamber 27 forms an exhaust gas circulation section 36 that allows the exhaust gas inside the housing chamber 27 to flow from top to bottom.

Additionally, an exhaust gas collection section 37 is provided in the lower portion of the housing chamber 27, above the oxygen-containing gas introduction section 28. This exhaust gas collection section 37 is connected to the exhaust gas circulation section 36. The exhaust gas collection section 37 communicates with an exhaust hole 38 formed in the bottom of the housing container 19. Furthermore, the thermal insulating members 33 are provided on the cell stack 2 side of the exhaust gas inner walls 35 as well.

Accordingly, exhaust gases produced when the module 17 operates (during a startup process, power generation, or a shutdown process) flow through the exhaust gas circulation section 36 and the exhaust gas collection section 37, and then are exhausted through the exhaust hole 38. Note that the exhaust hole 38 may be formed by cutting out a portion of the bottom of the housing container 19 or by providing a pipe-shaped member.

Inside the oxygen-containing gas supply member 24, a thermocouple 39 for measuring the temperature near the cell stacks 2 is disposed such that a temperature sensing portion 40 of the thermocouple 39 is positioned at the center in the longitudinal direction of the fuel cells 3 and at the center in the arrangement direction of the fuel cells 3.

Additionally, in the module 17 configured as described above, the fuel gas and the oxygen-containing gas discharged from the gas flow passages 15 of the fuel cells 3 and not used in power generation are combusted between an upper end of the fuel cells 3 and the reformers 20, making it possible to increase and/or maintain the temperature of the fuel cells 3. In addition, this makes it possible to heat the reformers 20 disposed above each of the fuel cells 3 (cell stacks 2), and efficiently perform reformation reactions in the reformers 20. Note that during normal power generation, the module 17 has an internal temperature of approximately 500 to 800° C. due to the abovementioned combustion process and the power generation in the fuel cells 3.

To improve the power generation efficiency of the fuel cells 3, it is preferable that the various passages through which the oxygen-containing gas flows have a structure that facilitates the flow of oxygen-containing gas. Specifically, in the module 17 illustrated in FIG. 4, it is preferable that the various passages have a structure whereby the oxygen-containing gas, which is introduced by the oxygen-containing gas introduction section 28, flows along both sides of the housing chamber 27, and is introduced to the oxygen-containing gas supply member 24 via the oxygen-containing gas distribution chamber 30, flows efficiently and is distributed evenly.

Accordingly, in the module 17 of the present embodiment, in a cross-section orthogonal to the arrangement direction of the fuel cells 3, first, when comparing a width W1 of the oxygen-containing gas introduction section 28 and a width W2 of the oxygen-containing gas circulation section 29, the width W2 of the oxygen-containing gas circulation section 29 is narrower than the width W1 of the oxygen-containing gas introduction section 28. As a result, the oxygen-containing gas introduced by the oxygen-containing gas introduction section 28 is able to flow efficiently to the oxygen-containing gas circulation section 29.

Here, it is preferable that the width W2 of the oxygen-containing gas circulation section 29 is set to a width that will not close as a result of deformation of the inner wall 25 and the outer wall 26 due to deterioration over time of the housing container 19, and can be set to a range of ⅓ to ¹/₃₀ the width W1 of the oxygen-containing gas introduction section 28. Note that the width W1 of the oxygen-containing gas introduction section 28 is not particularly limited but, if excessively wide, the size of the module will increase, which is a problem.

It is preferable that, when compared to each other, the widths W2 of the oxygen-containing gas circulation sections 29 positioned on both sides of the housing chamber 27 are in a range of ±10% of each other. As a result, substantially equal amounts of the oxygen-containing gas introduced by the oxygen-containing gas introduction section 28 will flow along each side of the housing chamber 27.

Next, when comparing a width W3 of the oxygen-containing gas distribution section 30 and a width (inner width) W4 of the oxygen-containing gas supply member 24, the width W4 of the oxygen-containing gas supply member 24 is narrower than the width W3 of the oxygen-containing gas distribution section 30. As a result, the oxygen-containing gas introduced to the oxygen-containing gas distribution section 30 is able to flow efficiently to the oxygen-containing gas supply member 24.

Here, it is preferable that the width W4 of the oxygen-containing gas supply member 24 is set to a width that will not close as a result of deformation of the oxygen-containing gas supply member 24 due to deterioration over time, and can be set to a range of ⅓ to ¹/₃₀ the width W3 of the oxygen-containing gas distribution section 30. Note that the width W3 of the oxygen-containing gas distribution section 30 is not particularly limited but, if excessively wide, the size of the module will increase, which is a problem. It is preferable that pressure loss of the oxygen-containing gas outflow opening 32 be considered when determining the aforementioned widths.

It is preferable that a depth dimension (dimension in the arrangement direction X of the fuel cells 3) of each of the oxygen-containing gas introduction section 28, the oxygen-containing gas circulation section 29, and the oxygen-containing gas distribution section 30 be substantially the same. A depth dimension of the oxygen-containing gas supply member 24 may be shorter than that of the oxygen-containing gas distribution section 30, but it is preferable that the depth dimension be set in a range whereby the advantageous effects described above can be obtained.

On the other hand, in the housing chamber 27, exhaust gases of fuel gas and oxygen-containing gas not used in power generation, and of fuel gas and the like resulting from the combustion of other fuel gases, and the like are produced. These exhaust gases are also efficiently discharged out of the housing container 19 and, as a result, the oxygen-containing gas is efficiently supplied to the fuel cells 3.

Therefore, in the module 17 of the present embodiment, when comparing a width W5 of the exhaust gas circulation section 36 provided on the side of the housing chamber 27 and a width W6 of the exhaust gas collection section 37 provided in the lower portion of the housing chamber 27, the width W5 of the exhaust gas circulation section 36 is narrower than the width W6 of the exhaust gas collection section 37. As a result, the exhaust gases that have flowed through the exhaust gas circulation sections 36 on each side of the housing chamber 27 are efficiently mixed in the exhaust gas collection section 37, and are efficiently expelled out of the housing chamber 27 through the exhaust hole 38.

Here, it is preferable that the width W5 of the exhaust gas circulation section 36 is set to a width that will not close as a result of deformation of the exhaust gas circulation sections 36 due to deterioration over time, and can be set to a range of ⅓ to ⅟₃₀ the width W6 of the exhaust gas collection section 37. Note that the width W6 of the exhaust gas collection section 36 is not particularly limited but, if excessively wide, the size of the module will increase, which is a problem.

It is preferable that, when compared to each other, the widths W5 of the exhaust gas circulation sections 36 positioned on both sides of the housing chamber 27 are in a range of ±10% of each other. As a result, substantially equal amounts of the exhaust gases in the housing chamber 27 will flow along each side of the housing chamber 27.

It is preferable that a depth dimension (dimension in the arrangement direction X of the fuel cells 3) of each of the exhaust gas circulation section 36 and the exhaust gas collection section 37 be substantially the same.

An electrolytic module can also be configured that houses an electrolytic cell stack device formed by arranging electrolytic cells, which are capable of generating hydrogen as a result of applying water vapor and voltage, as the cells in the housing chamber 27 of the module 17. In this case, oxygen is discharged as a byproduct from the electrolytic cells when generating hydrogen from the water vapor. However, if oxygen is present at a high concentration in the housing chamber 27, that oxygen may ignite due to some sort of impact or the like, or the electrolytic cells themselves may oxidize and deteriorate.

Therefore, in this case, the risk of ignition and deterioration of the electrolytic cells can be suppressed by using air as the first gas and purging the interior of the housing chamber 27 using air (in other words, replacing the high concentration oxygen with air). That is, in this case, gas containing the highly concentrated oxygen becomes exhaust gas. Thus, a module with good efficiency (electrolytic efficiency) can be obtained even when the module is an electrolytic module that includes an electrolytic cell stack device.

Figure 5:
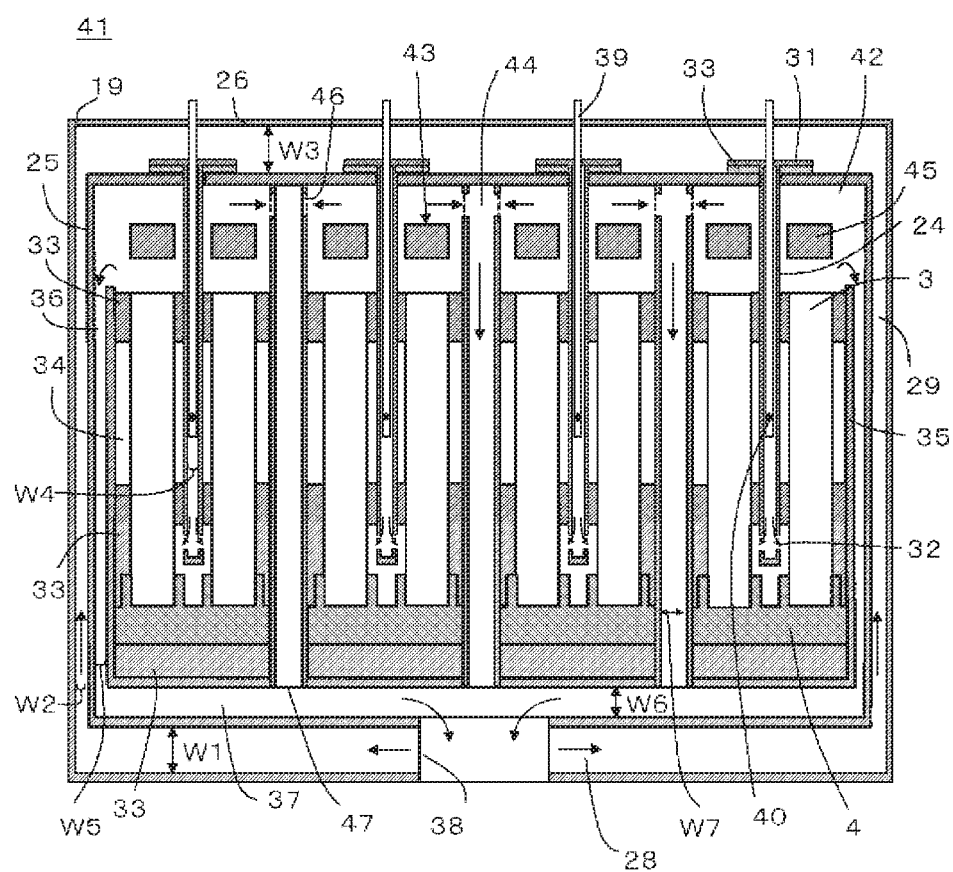
FIG. 5 is a cross-sectional view illustrating another example of a module according to the present embodiment.

FIG. 5 is a cross-sectional view illustrating another example of a module according to the present embodiment.

Figure 6A:
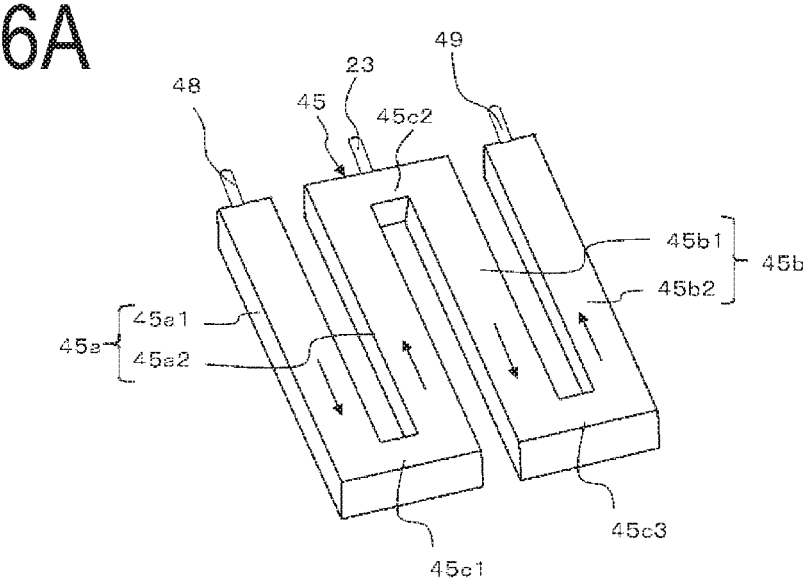
FIGS. 6A and 6B illustrate a reformer housed in the module illustrated in FIG. 5, extracted from the module.
Figure 6B:
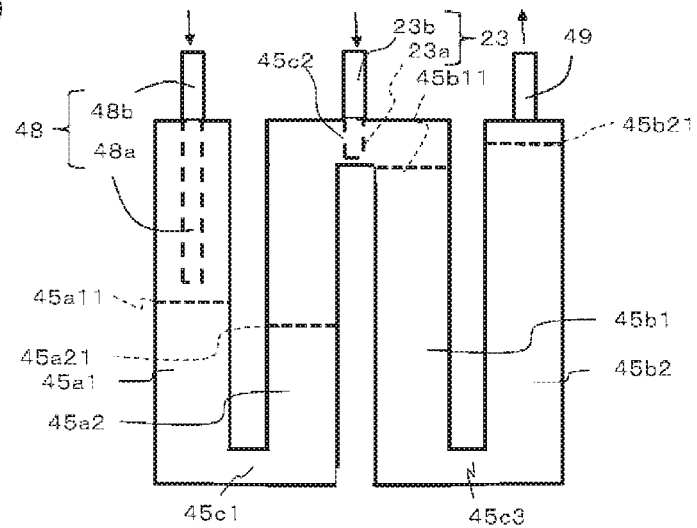

A module 41 illustrated in FIG. 5 differs from the module 17 illustrated in FIG. 4 in that four cell stack devices 43 are provided in a housing chamber 42, exhaust gas circulation members 44 are formed between the cell stack devices 43, and, as illustrated in FIGS. 6A and 6B, one reformer 45 is provided above the four cell stack devices. Note that configurations that are the same as in the module 17 illustrated in FIG. 4 are marked with the same reference signs and descriptions thereof are omitted.

When a plurality of cell stack devices 43 are housed within the housing chamber 42, a distance particularly between the fuel cell 3 in the cell stack device 43 positioned close to the center of the module and the exhaust gas circulation section 36 positioned on the side of the housing chamber 42 is increased, which may make it difficult to efficiently discharge the exhaust gas, discharged from the fuel cells 3 in the cell stack device 43 positioned close to the center of the module, out of the housing chamber 42.

In fuel cell devices in which fuel gas not used for power generation is combusted on the top end sides of the fuel cells 3 to produce combustion heat that keeps the temperature of the fuel cells 3 at a high temperature, exhaust gas stagnates on the top end sides of the fuel cells 3, thereby preventing fuel gas not used for power generation from being combusted efficiently and potentially causing a misfire. Particularly, if such misfiring occurs, the temperature of the fuel cells 3 cannot be increased and/or maintained at a high temperature, thereby potentially reducing the power output of the fuel cells 3 (cell stack devices 43).

Therefore, in the module 41 of the present embodiment illustrated in FIG. 5, the exhaust gas circulation members 44 are formed between adjacent cell stack devices 43 in addition to the abovementioned exhaust gas circulation sections 36 in order to discharge the exhaust gas not used for power generation.

These exhaust gas circulation members 44 are formed from a tubular container and are provided with exhaust gas inflow openings 46 in both sides of the upper end portion thereof that communicate with the housing chambers 42. Additionally, a lower end, namely a discharge port 47, of each of the exhaust gas circulation members 44 communicates with the exhaust gas collection section 37 provided in the lower portion of the housing chamber 42. Note that FIG. 5 illustrates an example in which the exhaust gas circulation member 44 is formed from a container that has a rectangular parallelepiped shape and is tubular. However, a plurality of cylinder-shaped containers may be arranged to form the exhaust gas circulation member 44.

In other words, either the exhaust gas circulation section 36 or the exhaust gas circulation member 44 is disposed on the side of each cell stack device 43. Exhaust gas not used for power generation can therefore flow efficiently to the exhaust gas circulation section 36 or the exhaust gas circulation member 44 nearest to the cell stack 2 of each cell stack device 43.

This makes it possible to prevent exhaust gas from stagnating at the top ends of the fuel cells 3 and to efficiently discharge the exhaust gas. In the cell stack devices 43 in which fuel gas is combusted at the top ends of the fuel cells 3, this also makes it possible to prevent misfiring, thereby making it possible to provide a module 41 with improved power output.

When comparing a width W7 of the exhaust gas circulation member 44 and the width W6 of the exhaust gas collection section 37 provided in the lower portion of the housing chamber 42, the width W7 of the exhaust gas circulation member 44 is narrower than the width W6 of the exhaust gas collection section 37. As a result, the exhaust gases that have flowed through the exhaust gas circulation members 44 are efficiently mixed in the exhaust gas collection section 37 and expelled out of the housing chamber 42 through the exhaust hole 38.

Specifically, the width W7 of the exhaust gas circulation member 44 can be set to a range of ⅓ to ⅟₃₀ the width W6 of the exhaust gas collection section 37. Note that the width W6 of the exhaust gas collection section 37 is not particularly limited but, if excessively wide, the size of the module will increase, which is a problem.

It is preferable that, when compared to each other, the widths W7 of the exhaust gas circulation members 44 are in a range of ±10% of each other. As a result, substantially equal amounts of exhaust gas will flow through each of the exhaust gas circulation members 44.

In cases where the exhaust gas circulation member 44 is formed from a tubular container, it is preferable that a depth dimension (dimension in the arrangement direction X of the fuel cells 3) of each of the exhaust gas circulation member 44 and the exhaust gas collection section 37 be substantially the same.

FIGS. 6A and 6B illustrate a reformer housed in the module illustrated in FIG. 5, extracted from the module.

Figure 7:
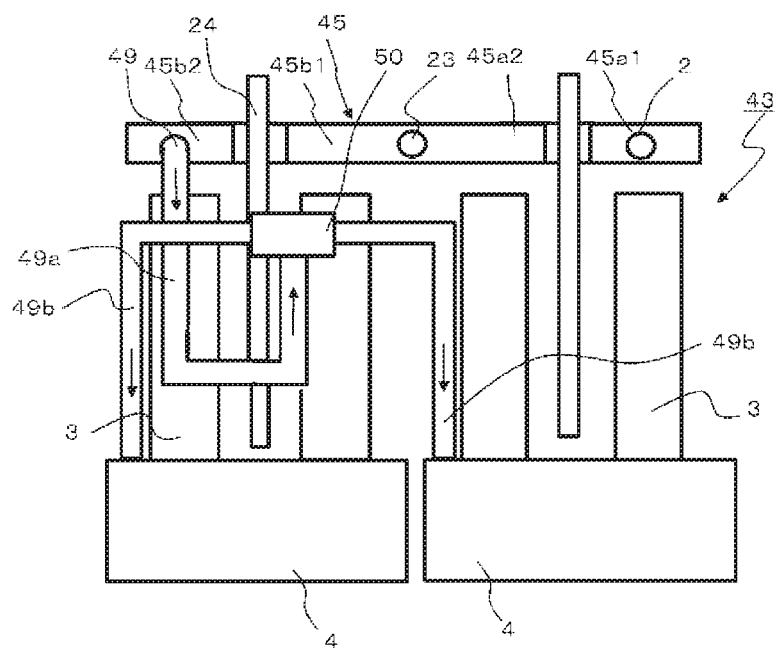
FIG. 7 is a side view illustrating an example of a configuration in which the reformer illustrated in FIG. 6 is provided above the cell stack device according to the present embodiment.

FIG. 7 is a side view illustrating an example of a configuration in which the reformer illustrated in FIG. 6 is provided above the cell stack device according to the present embodiment.

The W-shaped (meander shaped) reformer 45 illustrated in FIGS. 6A and 6B is provided above the four cell stacks 2 in the module 41 illustrated in FIG. 5.

As illustrated in FIGS. 6A and 6B, the reformer 45 includes a vaporizing unit 45a that vaporizes water to produce steam, and a reforming unit 45b that steam-reforms raw fuel using the steam produced by the vaporizing unit 45a.

The vaporizing unit 45a includes a vaporizing unit outgoing passage 45a1 through which water vapor flows from a first end side to a second end side, and a vaporizing unit return passage 45a2 through which water vapor flows from the second end side to the first end side. Additionally, the vaporizing unit outgoing passage 45a1 includes a tubular member 48a and a water supply member 48b. The tubular member 48a protrudes inward from a first end portion thereof along the vaporizing unit outgoing passage 45a1. The water supply member 48b is connected to the first end portion and supplies water to the tubular member 48a. Note that, in addition to the configuration where the tubular member 48a is provided so as to protrude inside the piping of the vaporizing unit and a water supply pipe, namely the water supply member 48b, is connected to this tubular member 48a, a configuration is also possible in which a water supply pipe, namely the water supply member 48b, is inserted from outside into the vaporizing unit, and a portion of this water supply pipe constitutes the tubular member 48a. In the following description, the configuration in which the water supply pipe is inserted from the outside into the vaporizing unit is used.

The reforming unit 45b includes a reforming unit outgoing passage 45b1 and a reforming unit return passage 45b2. Reformed gas produced by reforming raw fuel supplied from a raw fuel supply member, namely the raw fuel supply pipe 23, flows from a first end side to a second end side in the reforming unit outgoing passage 45b1; and the reformed gas flows from the second end side to the first end side in the reforming unit return passage 45b2. A reformed gas leading-out pipe 49 for leading the reformed gas out is connected to the reforming unit return passage 45b2. In the reformer 45 illustrated in FIGS. 6A and 6B, the water supply pipe 48, the raw fuel supply pipe 23, and the reformed gas leading-out pipe 49 are connected to a first side of the reformer 45.

Furthermore, in the reformer 45, the second end side of the vaporizing unit outgoing passage 45a1 is connected to the second end side of the vaporizing unit return passage 45a2 via a connecting passage (hereinafter referred to as "vaporizing unit connecting passage") 45c1; the first end side of the vaporizing unit return passage 45a2 is connected to the first end side of the reforming unit outgoing passage 45b1 via a connecting passage (hereinafter referred to as "vaporizing-reforming unit connecting passage") 45c2; and the second end side of the reforming unit outgoing passage 45b1 is connected to the second end side of the reforming unit return passage 45b2 via a connecting passage (hereinafter referred to as "reforming unit connecting passage") 45c3. The vaporizing unit outgoing passage 45a1, the vaporizing unit return passage 45a2, the reforming unit outgoing passage 45b1, and the reforming unit return passage 45b2 are arranged side by side with the sides thereof facing each other.

In the reformer 45, the water supplied to the vaporizing unit outgoing passage 45a1 is converted to water vapor, which flows sequentially through the vaporizing unit connecting passage 45c1, the vaporizing unit return passage 45a2, the vaporizing-reforming unit connecting passage 45c2, and the reforming unit outgoing passage 45b1. Additionally, in the vaporizing-reforming unit connecting passage 45c2, raw fuel is supplied from a raw fuel supply member 23b, namely the raw fuel supply pipe 23, and this raw fuel is mixed with the water vapor in the vaporizing-reforming unit connecting passage 45c2. This mixture is reformed while flowing through the reforming unit outgoing passage 45b1, the reforming unit connecting passage 45c3, and the reforming unit return passage 45b2, resulting in a hydrogen-containing reformed gas (fuel gas). This reformed gas is then led out through the reformed gas leading-out pipe 49.

The vaporizing unit outgoing passage 45a1, the vaporizing unit return passage 45a2, the reforming unit outgoing passage 45b1, the reforming unit return passage 45b2, the vaporizing unit connecting passage 45c1, the vaporizing-reforming unit connecting passage 45c2, and the reforming unit return passage 45c3 are all formed of pipes having a rectangular cross-sectional shape.

Dividers 45a11 and 45a21 are provided in the vaporizing unit outgoing passage 45a1 and the vaporizing unit return passage 45a2, respectively, and the space between these dividers 45a11 and 45a21 constitutes a vaporization chamber. A tip of the water supply pipe 48 (the tubular member) is positioned upstream of the divider 45a11, and water is supplied at a location before the vaporization chamber. Ceramic balls for promoting vaporization are stored in the vaporization chamber. The dividers 45a11 and 45a21 are formed such that steam can pass through but the ceramic balls cannot. Note that the placement of these dividers 45a11 and 45a21 can be changed as appropriate depending on the structure of the reforming unit, the hereinafter described structure of the cell stack, and the like.

Furthermore, dividers 45b11 and 45b21 are disposed in the reforming unit outgoing passage 45b1 and the reforming unit return passage 44b2, respectively, and the portions of the reforming unit outgoing passage 45b1, the reforming unit connecting passage 45c3, and the reforming unit return passage 45b2 between these dividers 45b11 and 45b21 constitute a reforming chamber. A reforming catalyst is stored in this reforming chamber. The dividers 45b11 and 45b21 are configured such that gas such as the water vapor, raw fuel, and reformed gas can pass through but the reforming catalyst cannot. Note that the placement of these dividers 45b11 and 45b21 can be changed as appropriate depending on the structure of the reforming unit, the hereinafter described structure of the cell stack, and the like.

In this reformer 45, the raw fuel supply member 23b that supplies the raw fuel, namely the raw fuel supply pipe 23, is connected to the vaporizing-reforming unit connecting passage 45c2 located between the vaporizing unit 45a and the reforming unit 45b. In this reformer 45, the raw fuel supply pipe 23 is connected to the vaporizing-reforming unit connecting passage 45c2, which is located downstream from the vaporizing unit outgoing passage 45a1 to which the water supply pipe 48 is connected. As such, the point at which water is supplied and the point at which raw fuel is supplied are separated by the space between the piping of the vaporizing unit outgoing passage 45a1 and the piping of the vaporizing unit return passage 45a2, and when viewed in the flow direction of the water vapor, the length of this space in the flow direction is long. Accordingly, even if the raw fuel has a low temperature, most of the supplied water will have been vaporized by the time the raw fuel is added and mixed. Therefore, it is possible to suppress decreases in the temperature in portions (the vaporizing unit outgoing passage 45a1) of the reformer 45. This makes it possible to improve the reforming efficiency.

Note that a configuration is possible in which the water supply pipe 48 and the raw fuel supply pipe 23 have a double pipe structure, and each pipe is connected to the vaporizing unit outgoing passage 45*a*1.

Furthermore, as illustrated in FIG. 7, the reformed gas (fuel gas) produced by the reformer 45 is supplied to two manifolds 4 via the reformed gas leading-out pipe 49. The fuel gas is then supplied via the manifolds 4 to the gas passages formed inside the fuel cells 3.

Note that, as illustrated in FIG. 7, the reformed gas produced by the reformer 45 is supplied from the reformed gas leading-out pipe 49 to the two manifolds 4 via a distributor 50. In other words, the reformed gas leading-out pipe 49 includes a first reformed gas leading-out pipe 49*a* that has a U shape extending from the reformer 45 to the distributor 50, and second reformed gas leading-out pipes 49*b* that extend downward from the distributor 50 to the two respective manifolds 4. The first reformed gas leading-out pipe 49*a* and the second reformed gas leading-out pipes 49*b* are configured to have the same length (pressure loss) so that an equal amount of reformed gas is supplied to each manifold 64.

Note that the vaporizing unit outgoing passage 45*a*1, the vaporizing unit return passage 45*a*2, the reforming unit outgoing passage 45*b*1, and the reforming unit return passage 45*b*2 in the reformer 45 each correspond to a single cell stack, and are disposed above that cell stack. As such, each of the vaporizing unit outgoing passage 45*a*1, the vaporizing unit return passage 45*a*2, the reforming unit outgoing passage 45*b*1, and the reforming unit return passage 45*b*2 can be efficiently heated.

The configuration is not limited to the example described herein, and other configurations including appropriate modifications (e.g. locations of the water supply pipe 48, the dividers, and the like) are possible.

Figure 8:
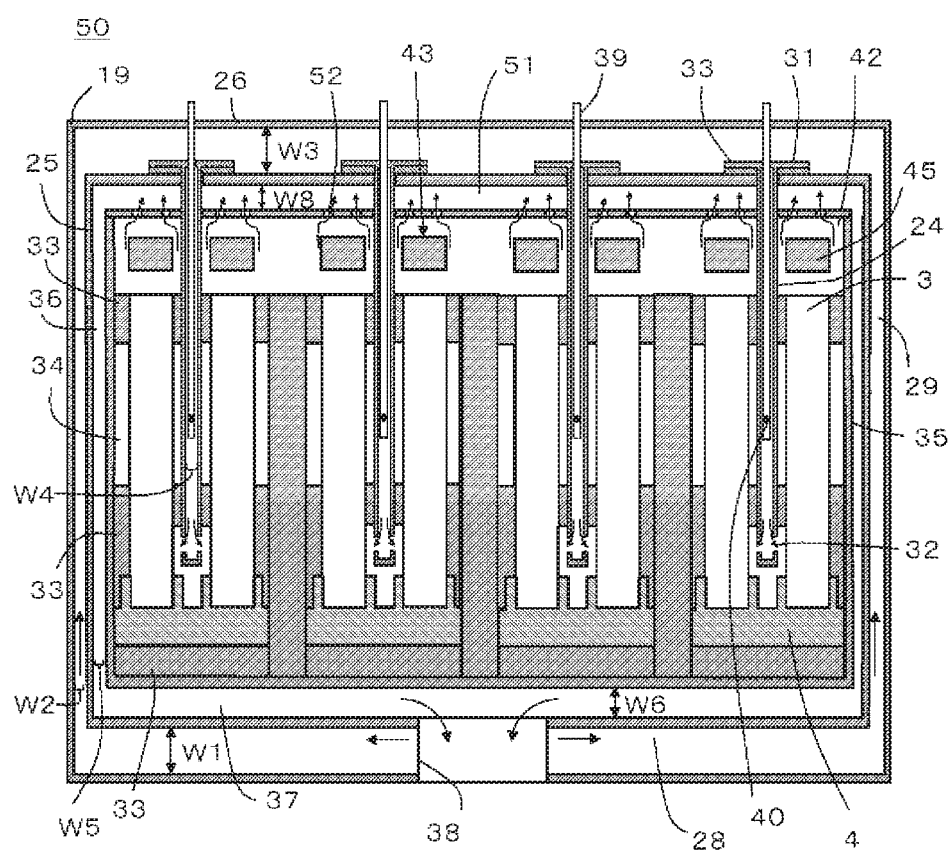
FIG. 8 is a cross-sectional view illustrating yet another example of a module according to the present embodiment.

FIG. 8 is a cross-sectional view illustrating yet another example of a fuel cell module according to the present embodiment.

A module 50 illustrated in FIG. 8 differs from the module 41 illustrated in FIG. 5 in that the module 50 includes an exhaust gas recovery section 51 that recovers exhaust gas discharged from the fuel cells 3 above a housing chamber 42 without including the exhaust gas circulation members 44 disposed between the cell stack devices and; and the exhaust gas recovery section 51 is connected to the exhaust gas circulation section 36.

The module 41 illustrated in FIG. 5 is advantageous in that the exhaust gas discharged from the fuel cells 3 can be efficiently discharged out of the module 41. However, in this case, the exhaust gas flowing through the exhaust gas circulation member 44 does not exchange heat with the oxygen-containing gas supplied from outside. As such, there is room for improvement with regards to heat exchange between the oxygen-containing gas supplied from outside and the exhaust gases discharged from the fuel cells 3.

On this point, in the module 50 illustrated in FIG. 8, the exhaust gas recovery section 51 that recovers the exhaust gas discharged from the fuel cells 3 is provided above a housing chamber 42, and the exhaust gas recovery section 51 is connected to the exhaust gas circulation section 36. Thus, heat exchange can be performed between all of the exhaust gas discharged from the fuel cells 3 and the oxygen-containing gas supplied from outside. As a result, oxygen-containing gas having an increased temperature is supplied to the fuel cells 3, thereby making it possible to improve power generation efficiency.

Here, it is preferable that a configuration is used in which the exhaust gas recovered by the exhaust gas recovery section 51 flows efficiently through the exhaust gas circulation section 36. Therefore, in the module 50 of the present embodiment, when comparing the width W5 of the exhaust gas circulation section 36 provided on the side of the housing chamber 42 and a width W8 of the exhaust gas recovery section 51, the width W5 of the exhaust gas circulation section 36 is narrower than the width W8 of the exhaust gas recovery section 51. As such, the exhaust gas recovered by the exhaust gas recovery section 51 flows efficiently through the exhaust gas circulation sections 36 on both sides of the housing chamber 42. As a result, heat exchange with the oxygen-containing gas can be increased and power generation efficiency can be improved.

The width W5 of the exhaust gas circulation section 36 can be set to a range of ⅓ to 1/30 the width W8 of the exhaust gas recovery section 51. Note that the width W8 of the exhaust gas recovery section 51 is not particularly limited but, if excessively wide, the size of the module will increase, which is a problem.

It is preferable that depth dimensions (dimension in the arrangement direction X of the fuel cells 3) of each of the exhaust gas circulation section 36 and the exhaust gas recovery section 51 be substantially the same.

Recovery holes 52 connecting to the housing chamber 42 are formed in the bottom surface of the exhaust gas recovery section 51. As a result, the exhaust gas discharged in the housing chamber 42 flows to the exhaust gas recovery section 51 through the recovery holes 52.

Figure 9:
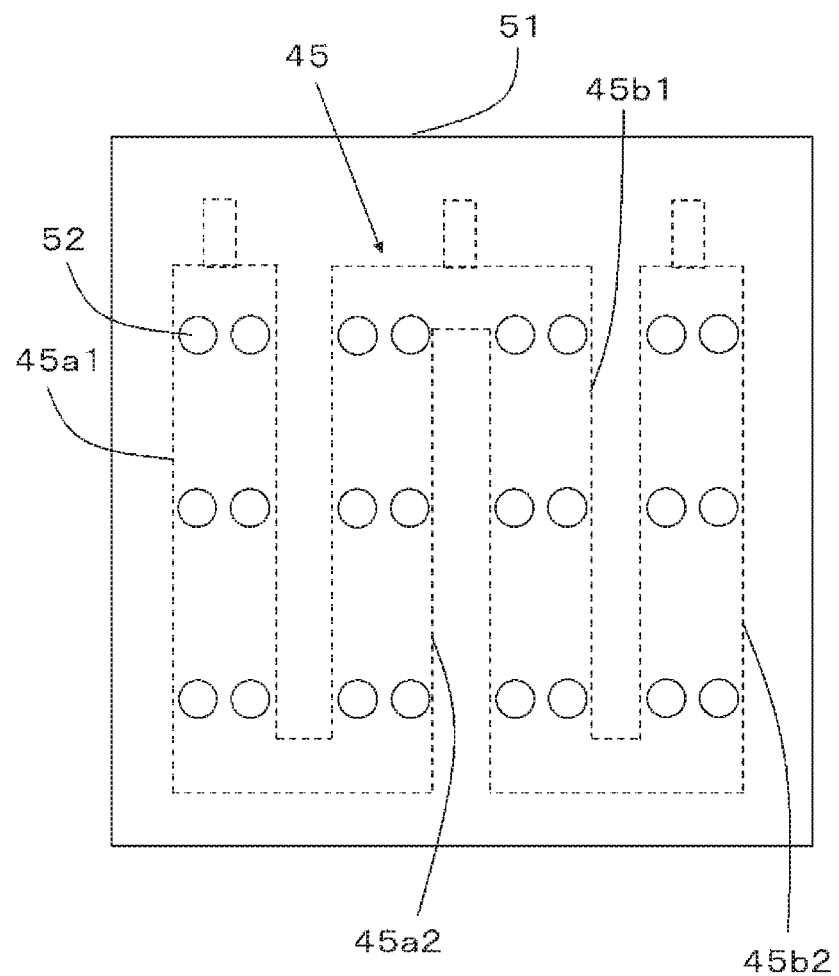
FIG. 9 is a plan view illustrating an extracted portion of a bottom surface of an exhaust gas recovery section of the module according to the present embodiment.

FIG. 9 is a plan view illustrating an extracted portion of the bottom surface of the exhaust gas recovery section 51. The reformer 45 is illustrated using dashed lines so that the positional relationship with the reformer 45 is understood.

As illustrated in FIG. 9, at least a portion and preferably all of the recovery holes 52 formed in the bottom surface of the exhaust gas recovery section 51 are formed facing the reformer 45. As described above, the reforming efficiency can be improved by heating the reformer 45 using combustion heat resulting from combusting the exhaust gas discharged from the fuel cells 3. Accordingly, it is preferable that the exhaust gas (combustion exhaust gas) discharged from the fuel cells 3 flows to the exhaust gas recovery section 51 after flowing around the reformer 45.

FIG. 9 illustrates an example in which all of the recovery holes 52 are formed facing the reformer 45. As a result of this configuration, the exhaust gas (combustion exhaust gas) discharged from the fuel cells 3 flows to the exhaust gas recovery section 51 after flowing around the reformer 45. This makes it possible to efficiently raise the temperature of the reformer 45 and improve the reforming efficiency.

Note that, in FIG. 9, an example is illustrated in which the number of recovery holes 51 formed facing each of the vaporizing unit outgoing passage 45*a*1, the vaporizing unit return passage 45*a*2, the reforming unit outgoing passage 45*b*1, and the reforming unit return passage 45*b*2 of the reformer 45 is the same. However, the number of recovery holes 51 is not limited thereto.

For example, in the reformer 45, the temperature is lower in the vaporizing unit outgoing passage 45*a*1 due to an endothermic reaction caused by the vaporization of the water. As such, the temperature of the cell stacks 2 located below the reformer 45 may decrease. Therefore, the number of recovery holes 51 facing the vaporizing unit outgoing passage 45*a*1 may be increased in order to raise the temperature of the vaporizing unit outgoing passage 45*a*1. Note that the number and disposal of the recovery holes 51 can be configured as deemed appropriate.

Figure 10:
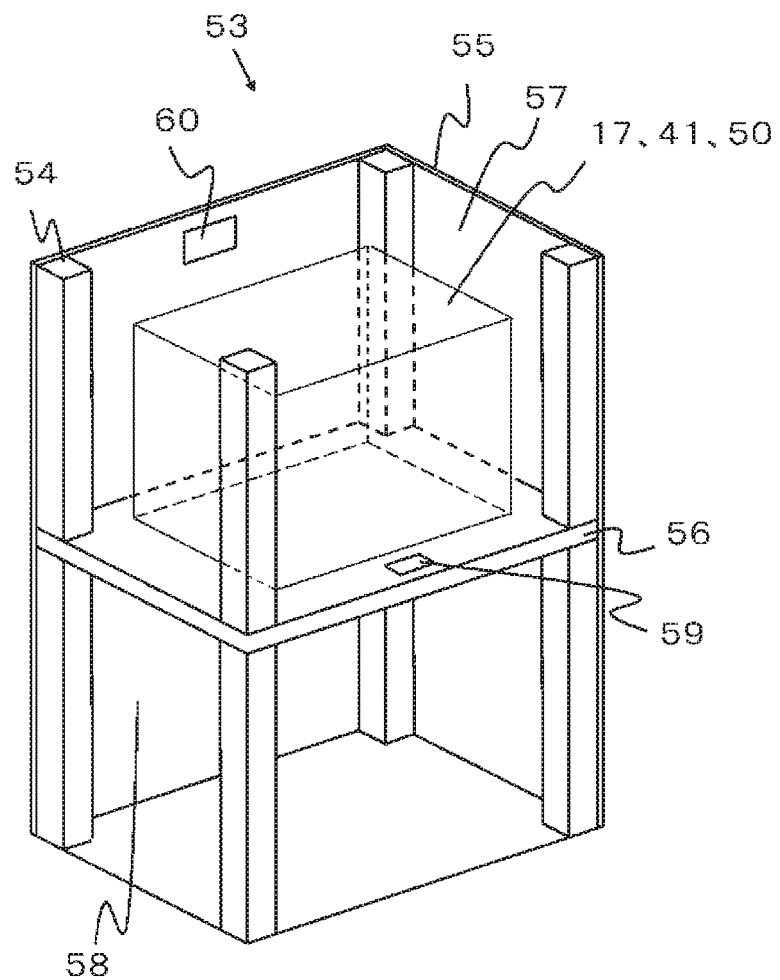
FIG. 10 is an exploded perspective view schematically illustrating an example of a fuel cell device according to the present embodiment.

FIG. 10 is an exploded perspective view illustrating an example of a fuel cell device in which any of the modules 17, 41, and 50 and an auxiliary device configured to operate the module are housed in an external case. Note that some of the components of the configuration are not illustrated in FIG. 10.

In the fuel cell device 53 illustrated in FIG. 10, an external case constituted from supports 54 and exterior plates 55 is divided into upper and lower portions by a divider 56. The upper portion constitutes a module housing chamber 57 that houses the various modules. The lower portion constitutes an auxiliary device housing chamber 58 that houses auxiliary devices configured to actuate the various modules. Note that the auxiliary devices housed in the auxiliary device housing chamber 58 are not illustrated.

Furthermore, an airflow hole 59 is formed in the divider 56. This airflow hole 50 allows air in the auxiliary device housing chamber 58 to flow into the module housing chamber 57. Additionally, an exhaust hole 60 is formed in one of the outer plates 57 of the module housing chamber 57. Air is exhausted out of the module housing chamber 57 through this exhaust hole 60.

In this type of fuel cell device, the various modules described above are housed inside an outer casing, thereby making it possible to provide a fuel cell device 53 with improved power generation efficiency.

An aspect of the present disclosure has been described in detail. However, the present disclosure is not limited to the embodiment described above, and various modifications and improvements can be made.

For example, in the embodiment described above, an example was described in which the modules 41 and 50 include a cell stack device in which one reformer 45 is disposed above four of the cell stacks 2. However, configurations are possible in which, for example, the cell stack device includes one reformer disposed above two or three cell stacks 2, or the cell stack device includes one reformer disposed above five or more cell stacks. In such cases, the shape of the reformer may be modified as deemed appropriate.

Additionally, an example was described in which two of the cell stacks 2 are disposed on each manifold 4. However, configurations are possible in which one cell stack is disposed on each manifold, or three or more cell stacks are disposed on each manifold.

Additionally, the examples described above employ so-called vertical fuel cells for the fuel cells 3. However, horizontal fuel cells in which a plurality of horizontal power generating devices are arranged on a support body may also be used.

For example, in the above embodiment, the fuel cells 3, the fuel cell stack device 1, the modules 17, 41, and 50, and the fuel cell device 53 were described. However, the present embodiment can also be applied in an electrolytic cell (SOEC) that generates hydrogen and oxygen ($O_2$) by electrolyzing water vapor (water) by applying water vapor and voltage to a cell, and can also be applied to an electrolytic cell stack device, an electrolytic module, and an electrolytic device provided with this electrolytic cell.

What is claimed is:

1. A module, comprising:
   a housing container comprising an outer wall and an inner wall; and
   a plurality of cell stack devices housed within the inner wall of the housing container and comprising one or more cell stacks comprising an arrangement of a plurality of cells; wherein
   the housing container further comprises:
      a housing chamber defined by an exhaust gas inner wall housed within the inner wall, the housing chamber housing the plurality of cell stack devices;
      a first gas introduction section provided in a lower portion of the housing container between the outer wall and the inner wall, and configured to introduce a first gas supplied into the housing chamber; and
      a first gas circulation section provided on a side of the housing chamber between the outer wall and the inner wall and connected to the first gas introduction section;
      an exhaust gas circulation section positioned on a side of the housing chamber between the exhaust gas inner wall and the inner wall and adjacent to the first gas circulation section, through which exhaust gases discharged from the cells are circulated;
      an exhaust gas collection section positioned in the lower portion of the housing container between the exhaust gas inner wall and the inner wall, and connected to the exhaust gas circulation section; and
      an exhaust gas recovery section positioned above the housing chamber between the exhaust gas inner wall and the inner wall, and connected to the exhaust gas circulation section, the exhaust gas recovery section being configured to recover exhaust gases discharged from the cells; and
   the module is free from the exhaust gas circulation section between the plurality of cell stack devices.

2. The module according to claim 1, further comprising:
   in an upper portion of the housing container between the inner wall and the outer wall and above the exhaust gas recovery section, a first gas distribution section connected to the first gas circulation section and configured to distribute the first gas.

3. The module according to claim 1, further comprising:
   a plurality of fuel cells as the plurality of cells and an oxygen-containing gas as the first gas;
   a reformer positioned above the one or more cell stacks with a respective portion of the reformer above the respective one or more cell stacks of a cell stack device of the plurality of cell stack devices, the reformer housed within the exhaust gas inner wall, and configured to generate a fuel gas to be supplied to the plurality of cells; and
   recovery holes provided in the exhaust gas inner wall defining a bottom surface of the exhaust gas recovery section, the recovery holes configured for recovery of exhaust gases discharged from the cells; wherein
   at least a portion of the recovery holes are formed facing the reformer.

4. A module accommodation device, comprising:
   the module according to claim 1;
   an auxiliary device configured to actuate the module; and
   an exterior case housing the module and the auxiliary device.

5. The module according to claim 2, further comprising:
a plurality of first gas supply members connected to the first gas distribution section and configured to supply the first gas into the housing chamber,
wherein each first gas supply member of the plurality of first gas supply members extends into an area between the one or more cell stacks of a respective cell stack device of the plurality of cell stack devices.

6. The module according to claim 5, wherein
each first gas supply member of the plurality of first gas supply members comprises a gas outflow opening configured to provide the first gas at a height below a halfway-height of the plurality of cells.

7. The module according to claim 5, wherein
in a cross-section orthogonal to the arrangement direction of the cells, a width of each first gas supply member of the plurality of first gas supply members is narrower than a width of the first gas distribution section.

8. The module according to claim 1, further comprising:
a plurality of manifolds housed within the exhaust gas inner wall below a respective cell stack device of the plurality of cell stack devices, the plurality of manifolds configured to supply a second gas to the respective cell stack device.

9. The module according to claim 7, wherein
the one or more cell stacks of the respective cell stack device are fixed to the respective manifold of the plurality of manifolds.

10. The module according to claim 1, wherein
each cell stack device of the plurality of cell stack devices comprises one or more cell stack support members for the respective one or more cell stacks, the one or more cell stack support members electrically connected to outermost cells of the respective plurality of cells.

11. The module according to claim 1, wherein
a width of the exhaust gas circulation section is narrower than a width of the exhaust gas recovery section.

12. The module according to claim 10, wherein
the width of the exhaust gas circulation section is in a range from 1/3 to 1/30 of the width of the exhaust gas recovery section.

13. The module according to claim 1, wherein
a width of the first gas circulation section is narrower than a width of the first gas introduction section.

14. The module according to claim 10, wherein
the width of the first gas circulation section is in a range from 1/3 to 1/30 of the width of the first gas introduction section.

* * * * *